US011870830B1

(12) United States Patent
Bhatia et al.

(10) Patent No.: US 11,870,830 B1
(45) Date of Patent: Jan. 9, 2024

(54) EMBEDDED STREAMING CONTENT MANAGEMENT

(71) Applicant: Twitch Interactive, Inc., San Francisco, CA (US)

(72) Inventors: Randeep S. Bhatia, Berkeley, CA (US); Adam Zabarsky, Berkeley, CA (US); Tracy Chan, Belmont, CA (US); Michael Jeremy Temkin, San Francisco, CA (US); Skji Conklin, San Francisco, CA (US); Sean P. McMullan, Culver City, CA (US); Justin Lewis Martinez, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 17/117,876

(22) Filed: Dec. 10, 2020

(51) Int. Cl.
*H04L 65/612* (2022.01)
*H04N 21/2187* (2011.01)
*H04L 65/70* (2022.01)
*H04L 65/75* (2022.01)

(52) U.S. Cl.
CPC ........... *H04L 65/612* (2022.05); *H04L 65/70* (2022.05); *H04L 65/765* (2022.05); *H04N 21/2187* (2013.01)

(58) Field of Classification Search
CPC ............. H04N 7/0885; H04N 21/8547; H04N 21/2187; H04L 65/605; H04L 29/06027; H04L 65/4084; H04L 65/607
USPC ........................................................ 709/231
See application file for complete search history.

(56) References Cited

U.S. PATENT DOCUMENTS

| | | | | |
|---|---|---|---|---|
| 2007/0124781 A1* | 5/2007 | Casey | ............... | H04N 21/6125 725/94 |
| 2007/0245243 A1* | 10/2007 | Lanza | ............... | H04N 7/17318 715/205 |
| 2014/0195653 A1* | 7/2014 | Alexander | .......... | H04L 65/4084 709/219 |
| 2016/0057475 A1* | 2/2016 | Liu | ...................... | G11B 27/031 725/87 |
| 2016/0105698 A1* | 4/2016 | Tang | .................. | H04N 21/4627 725/25 |

* cited by examiner

Primary Examiner — Tan Doan
(74) Attorney, Agent, or Firm — Knobbe, Martens, Olson & Bear, LLP

(57) ABSTRACT

A live streaming service and on-demand streaming service are provided to live stream content from the live streaming service into an on-demand content application associated with the on-demand streaming service. Content producers may produce or otherwise be associated with pre-generated content (e.g., pre-recorded audio, video, etc.) that is available to content consumers on demand, through the on-demand content application. The content producers may also produce live content (e.g., live audio, video, etc.) that is available to content consumers in substantially real time as the live content is being generated, through a live content application associated with a live streaming service. The cross-service linking of content producer accounts facilitates integration of content from the live streaming service into the on-demand content application, including presentation of live content from the live streaming service in a live content application-managed window within an interface of the on-demand content application.

20 Claims, 7 Drawing Sheets

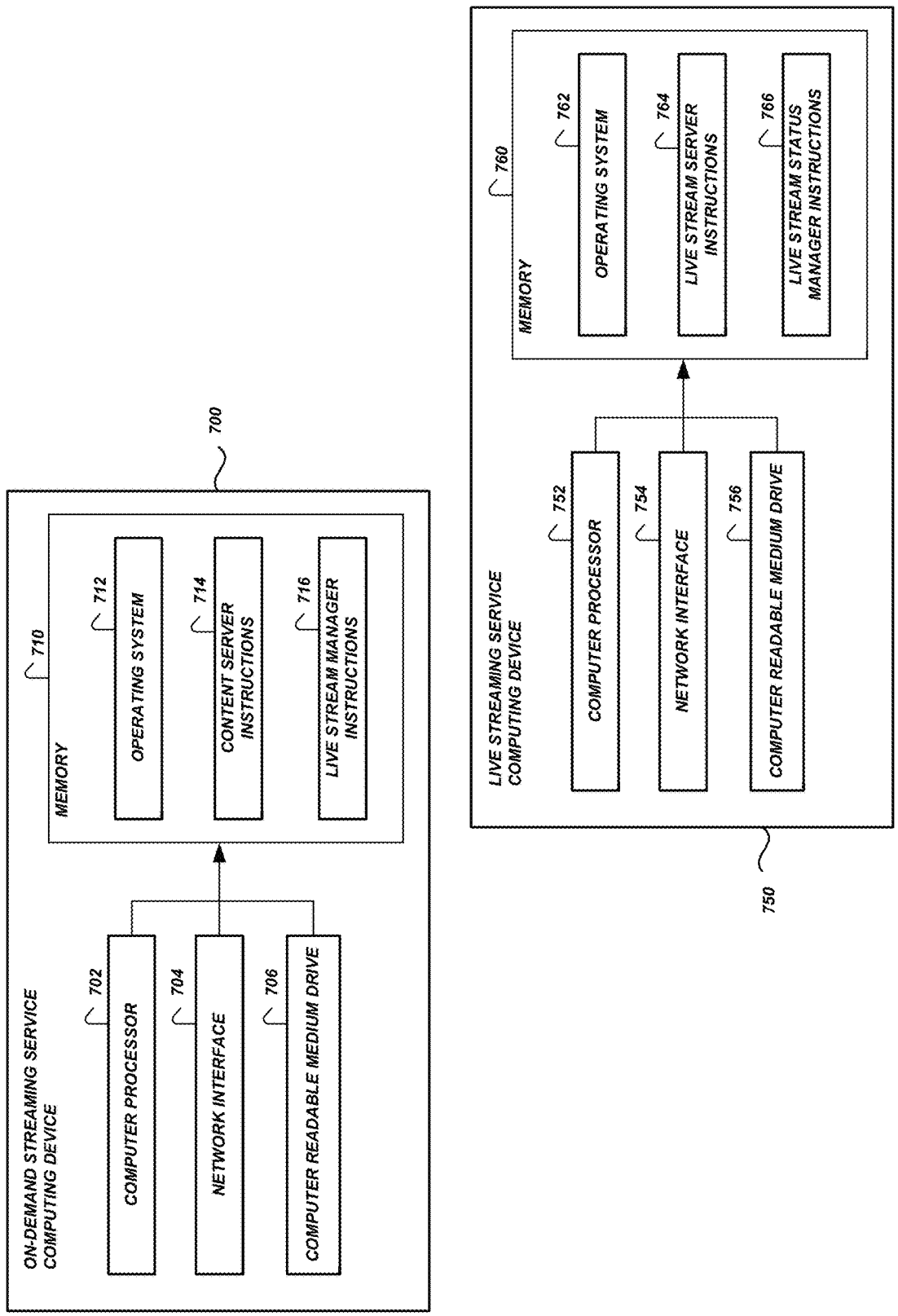

US 11,870,830 B1

EMBEDDED STREAMING CONTENT MANAGEMENT

BACKGROUND

Computing devices can utilize communication networks to exchange data. One computing device (the source computing device) transmits data to another computing device (the destination computing device). In a common scenario, the data may represent multimedia content. For example, the source computing device may capture audio to generate an audio data signal, and capture video to generate a video data signal. The source computing device may then send multimedia data, based on the audio data signal and video data signal, over a network to one or more destination computing devices. The multimedia data may be sent at a future time (e.g., as a recording of prior events) or in real-time (e.g., as a live stream of the audio and video captured by the source device). Destination computing devices may present the multimedia data using various output devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 7 is a block diagram illustrating components of computing devices configured to execute processes for managing on-demand streaming sessions and live streaming sessions according to some embodiments.

DETAILED DESCRIPTION

Figure 1:
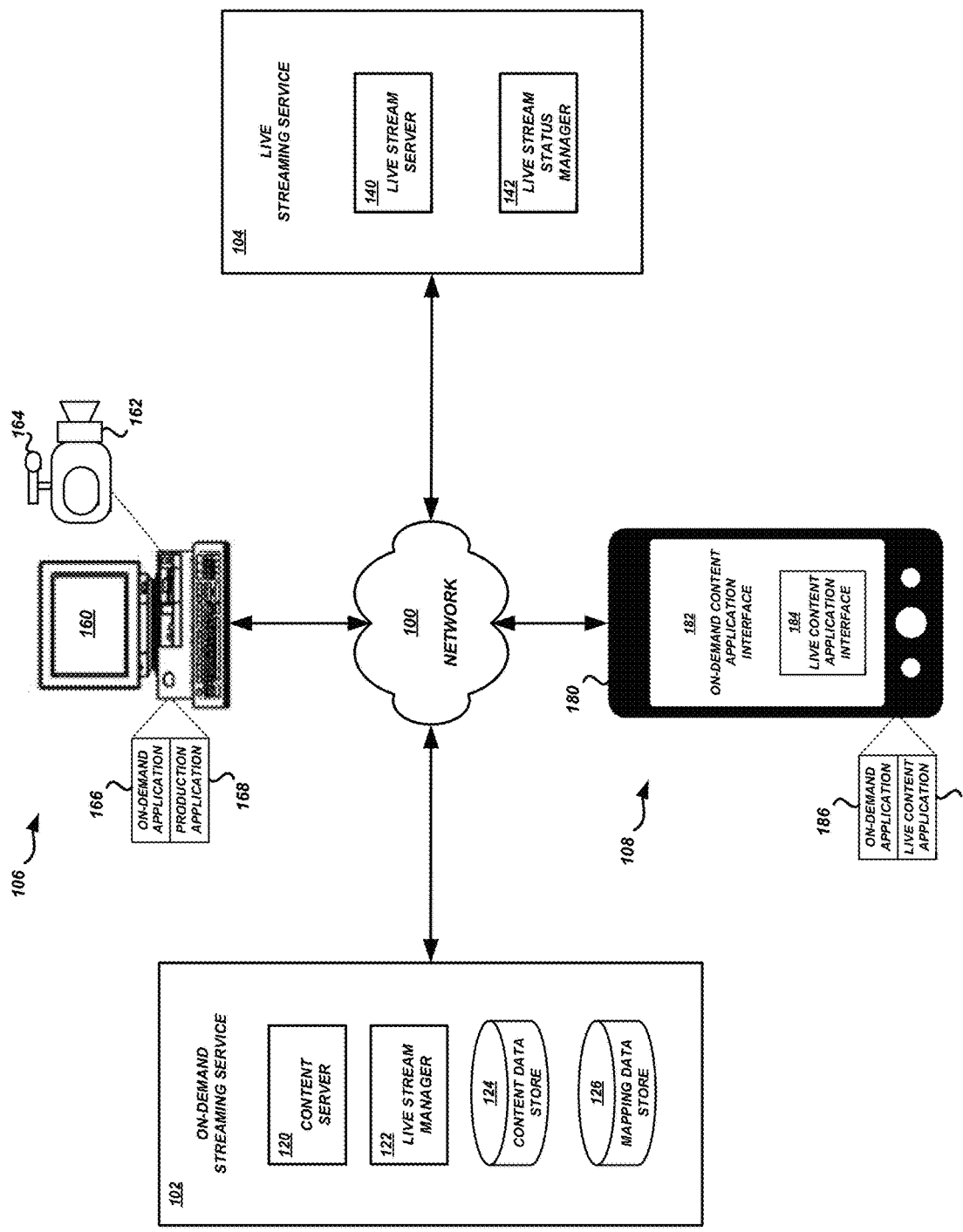
FIG. 1 is a block diagram illustrating various data flows and interactions between an on-demand streaming service, a live streaming service, a content producer, and a content consumer according to some embodiments.

The present disclosure is directed to the integration of live stream content from a live streaming service into an on-demand content application associated with an on-demand streaming service. Content producers may produce or otherwise be associated with pre-generated content (e.g., pre-recorded audio, video, etc.) that is available to content consumers on demand, through the on-demand content application. The content producers may also produce live content (e.g., live audio, video, etc.) that is available to content consumers in substantially real time as the live content is being generated, through a live content application associated with a live streaming service. To bridge the gap between the different streaming services and make live stream content from the live streaming service discoverable and accessible through the on-demand streaming service, account data for individual content producers in the different streaming services may be linked. The linking of account data facilitates integration of content from the live streaming service into the on-demand content application, including presentation of live content from the live streaming service in a live content application-managed window within an interface of the on-demand content application.

Generally described, on-demand content refers to content that is stored in one or more persistent data stores and is made available for presentation, in part or in full, upon request of a content consumer. Illustratively, on-demand content may include audio, video, images, text, some combination thereof, etc. The on-demand content may be stored in the form of one or more files or other storage objects, in compressed or uncompressed form. For example, the on-demand content may be stored as a file encoded using Moving Picture Experts Group Audio Layer III ("MP3"), Moving Pictures Expert Group 4 ("MPEG-4"), Advanced Audio Encoding ("AAC"), Windows Media Audio ("WMA"), Windows Media Video ("WMV"), Free Lossless Audio Codec ("FLAC"), or other encoding standards or algorithms. A data store for on-demand content may be part of, or otherwise accessible to, a consumer device, or it may be located remote from the consumer device, such when the data store is part of an on-demand streaming service. Upon request, a content item (e.g., file or object) may be loaded in whole or in part for presentation. In some cases, the content may be streamed on demand, in which case it may be referred to as on-demand streaming content. "Streaming" refers to the packetized transmission of content over a network to a consumer device for presentation as the packets of content are received by the consumer device. In the case of on-demand streaming content, the content item is a pre-generated content item stored in a persistent content data store of an on-demand streaming service. The on-demand streaming content may be streamed to a consumer device for presentation rather than provided as a complete data storage object that is copied or transferred in its entirety to a persistent data store of the consumer device before presentation. In some embodiments, streaming content may be generated, transmitted, and accessed via any of a number of different protocols, such as Real Time Messaging Protocol ("RTMP"), Real Time Streaming Protocol ("RTSP"), Moving Pictures Experts Group—Dynamic Streaming over Hypertext Transfer Protocol ("MPEG-DASH"), or other streaming protocols.

Generally described, live stream content refers to content that is generated by a content producer and provided to content consumers in substantially real time, as the content is produced. The intent of live streaming is often that presentation of content is to occur in substantially real time as the content is being created, and therefore the entire content item has not been completely created prior to accessing the stream. In this case, "substantially real time" accounts for normal latencies in computer processing, network communication, and other technical operations and conditions that may delay presentation of the content at a consumer device for a small but non-zero amount of time after the content is captured or created by the content producer device. In some cases, content producers and/or content consumers may perceive the delay, but the goal of live stream content in substantially real time is to create a simultaneous or nearly-simultaneous shared experience among content producer and content consumer, and/or among multiple content consumers. Live stream content may include audio, video, images, text, some combination thereof, etc., and may be generated, transmitted, and accessed via any of a number of different protocols such as RTMP, RTSP, MPEG-DASH, or other streaming protocols. In some cases, live stream content may involve two-way communication between content producers and content consumers. For example, content consumers may interact with the content producer, other content consumers, and/or the content itself through the use of audio, video, text, and the like.

Conventional on-demand streaming services provide functionality that is different than, and requires different computing resources and configuration than, live streaming services. For example, an on-demand streaming service maintains a potentially large data store, or set of data stores, to store pre-generated content that is accessible on demand. The streaming of on-demand content to users may make significant use of buffering, in some cases involving sending data representing multiple time units of content (e.g., many seconds or minutes of content) to the consumer device prior to beginning presentation of the content in order to mitigate or eliminate the effects that transient network issues may have on consumption of content at the high quality (e.g., highest bitrate or resolution). In contrast, the infrastructure and functionality of live streaming services may be more focused on providing content to many different consumers as fast as possible in order to maintain the substantially real-time presentation of content to consumers, to facilitate real-time interactions between consumers and producers, etc. Because live content is meant to be presented in substantially real time as it is produced, live streaming services may focus on minimizing latency and implementing bitrate, resolution, or other quality-based modifications to address network bandwidth issues and prioritize the perception of real-time presentation of content even if quality is impacted as a result. In addition to the technical challenges and corresponding infrastructure and design differences between on-demand and live streaming services, the content itself may be subject to different types of restrictions (e.g., different legal restrictions). Thus, an on-demand streaming service wishing to incorporate live streaming functionality (or vice versa) may face design challenges, implementation challenges, legal challenges, and other hurdles. To avoid such challenges and leverage the solutions already developed by a live streaming service, an on-demand streaming service may wish to integrate features of a live streaming service into the on-demand streaming service. However, such integration can present its own challenges, including dealing with different sets of content producer and/or consumer accounts, facilitating discovery of live stream content in an on-demand content application without requiring users to manually operate two separate applications, etc.

Some aspects of the present disclosure address the issues above, among others, through the use of account linking and communication of live streaming status information between services. A content producer may have an account with the live streaming service to provide live content that is to be made available via the live streaming service. The content producer may also have an account with the on-demand streaming service to distribute pre-generated content (e.g., pre-recorded audio, video, etc.) of the content producer, or the content producer may otherwise be associated with pre-generated content that is available via the on-demand streaming service. To facilitate the discovery of and access to the content producer's live stream content via the on-demand streaming service, the content producer's accounts for the services may be linked. For example, the content producer may access a feature of the on-demand streaming service and link the corresponding live streaming service account by providing login credentials, participating in an authentication and authorization process, etc. The linking of accounts may be represented by account linking data that is maintained by the on-demand streaming service and/or live streaming service. The on-demand streaming service may then request that the live streaming service provide the live streaming status of the content producer (e.g., whether the content producer is currently, or will soon be, live streaming content via the live streaming service). When the content producer is (or will soon be) live streaming content via the live streaming service, the on-demand streaming service can provide an indication of the live streaming status to content consumers. For example, the on-demand streaming service can send notifications to consumers who may be interested in the live stream content, make the live stream accessible via the user interface of the on-demand content application, indicate the live streaming status in search results in which the content producer appears, etc.

Additional aspects of the present disclosure relate to presenting live stream content from the live streaming service within the interface of the on-demand content application. The on-demand content application may be configured to provide a window in which an application or other code associated with the live streaming service can present live stream content. In some embodiments, an application or other executable component (e.g., a plug-in) associated with the live streaming service may be installed on the consumer device. When live stream content from a content producer is available, the on-demand content application may indicate the availability in a user interface. When a user requests or otherwise activates presentation of the live stream content within the user interface of the on-demand content application, the on-demand content application may execute the live content application and provide data indicating the live stream content to be presented. The live content application may then access the live stream content from the live streaming service and present the live stream content within a window of the interface of the on-demand content application. In some embodiments, the on-demand content application may provide a window for execution of web-based live stream content from the live streaming service, such as a web page and/or a web-browser-based media player.

Various aspects of the disclosure will now be described with regard to certain examples and embodiments, which are intended to illustrate but not limit the disclosure. Although aspects of some embodiments described in the disclosure will focus, for the purpose of illustration, on particular examples of content, user interface integrations, and live stream availability updates, the examples are illustrative only and are not intended to be limiting. In some embodiments, the techniques described herein may be applied to additional or alternative types of content, user interface integrations, and live stream availability updates.

Network-Based Content Distribution Environment

With reference to an illustrative embodiment, FIG. 1 shows an example network environment in which aspects of the present disclosure may be implemented. In some embodiments, as shown, the network environment may include an on-demand streaming service 102, a live streaming service 104, any number of content production systems 106 (also referred to as "content producers"), and any number of content consumption systems 108 (also referred to as "content consumers"). The on-demand streaming service 102, live streaming service 104, content producer(s) 106, and content consumer(s) 108 may communicate with each other via one or more communication networks 100.

In some embodiments, a communication network 100 (also referred to simply as a "network") may be a publicly-accessible network of linked networks, possibly operated by various distinct parties, such as the Internet. In some cases, the network 100 may be or include a private network, personal area network, local area network, wide area network, global area network, cable network, satellite network, cellular data network, etc., or a combination thereof, some or all of which may or may not have access to and/or from the Internet.

The on-demand streaming service 102 may be a logical association of one or more computing devices for storing and distributing content pre-generated content to content consumers 108 on demand. For example, the on-demand streaming service 102 can include a content server 120 to manage on-demand streaming requests and content presentation sessions for content consumers 108. The on-demand streaming service 102 may also include a live stream manager 122 for managing communication with the live streaming service 104 regarding the live stream status of content producers 106, managing the functionality of the on-demand streaming service 102 to integrate live streams into the interface of on-demand content applications, and the like. The on-demand streaming service 102 may also include a content data store 124 for storing pre-generated content (e.g., pre-recorded audio and/or video) to be distributed to content consumers 108 on demand via the content server 120. The on-demand streaming service 102 may also include a mapping data store 126 for storing data representing links or other mappings between content producer accounts with the on-demand streaming service 102 and corresponding content producer accounts with the live streaming service 104.

The on-demand streaming service 102 (or individual components thereof, such as the content server 120, the live stream manager 122, the content data store 124, the mapping data store 126, etc.) may be implemented on one or more physical server computing devices. In some embodiments, the on-demand streaming service 102 (or individual components thereof) may be implemented on one or more host devices, such as blade servers, midrange computing devices, mainframe computers, desktop computers, or any other computing device configured to provide computing services and resources. For example, a single host device may execute one or more content servers 120, the live stream managers 122, the content data stores 124, the mapping data stores 126, some combination thereof, etc. The on-demand streaming service 102 may include any number of such hosts.

In some embodiments, the features and services provided by the on-demand streaming service 102 may be implemented as web services consumable via one or more communication networks. In further embodiments, the on-demand streaming service 102 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The live streaming service 104 may be a logical association of one or more computing devices for managing streams of live content from content producers 106 to content consumers 108 in substantially real time, as the content is produced by the content producers 106. For example, the live streaming service 104 can include a live stream server 140 to manage streams of live content from content producers 106 to content consumers 108. The live streaming service 104 may also include a live stream status manager 142 for managing communication with the on-demand streaming service 102 regarding the live stream status of content producers 106.

The live streaming service 104 (or individual components thereof, such as the live stream server 140, the live stream status manager 142, etc.) may be implemented on one or more physical server computing devices. In some embodiments, the live streaming service 104 (or individual components thereof) may be implemented on one or more host devices, such as blade servers, midrange computing devices, mainframe computers, desktop computers, or any other computing device configured to provide computing services and resources. For example, a single host device may execute one or more live stream servers 140, live stream status managers 142, some combination thereof, etc. The live streaming service 104 may include any number of such hosts.

In some embodiments, the features and services provided by the live streaming service 104 may be implemented as web services consumable via one or more communication networks. In further embodiments, the live streaming service 104 (or individual components thereof) is provided by one or more virtual machines implemented in a hosted computing environment, such as a cloud computing environment.

A content producer 106 may include any of a wide variety of computing devices 160, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. The computing device 160 may provide processing and network communication capabilities to facilitate the generation and transmission of live stream content to the live streaming service 104. The content producer 106 may have various input and/or output components that may be integrated into or in communication with the computing device 160. For example, the content producer 106 may include a camera 162 (or other image sensor) to generate video or other image data, a microphone 164 (or other audio sensor) to generate audio data, and/or other components.

The content producer 106 may include various subsystems to manage the generation of live stream content, manage accounts with content services, and the like. For example, the content producer 106 may include an on-demand content application 166 to access the on-demand streaming service 102, link accounts of content producer 106 with the on-demand streaming service 102 and live streaming service 104, and otherwise manage the content producer's presence on the on-demand streaming service 102. As another example, the content producer 106 may include a live stream production application 168 to generate streaming content for transmission to, and distribution by, the live streaming service 104. The on-demand content application 166 and/or live stream production application 168 may be implemented using computer-executable instructions loaded into computer-readable memory and executed by one or more processors of a computing device 160.

A content consumer 108 may include any of a wide variety of electronic devices 180 with content presentation capabilities, including televisions, personal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances. The computing device 180 may provide processing and network communication capabilities to facilitate obtaining and presenting on-demand streaming content from the on-demand streaming service 102, live stream content from the live streaming service 104, and the like. The content consumer 108 may include various subsystems to manage the consumption of streaming content. For example, the content consumer 108 may include an on-demand content application 186 to access the on-demand streaming service 102 and present on-demand content. As another example, the content consumer 108 may include a live content application 188 to access the live streaming service 104 and present live stream content. The on-demand content application 186 and/or live content application 188 may be implemented using computer-executable instructions loaded into computer-readable memory and executed by one or more processors of a computing device 180.

The content consumer 108 may present various user interfaces associated with—and including content obtained from—the on-demand streaming service 102 and live streaming service 104. For example, the on-demand content application 186 may cause presentation of an on-demand application interface 182 that allows interaction with the on-demand streaming service 102. Within the on-demand application interface 182, the live content application 188 may cause presentation of a live content application interface 184.

In an illustrative embodiment, a user of a content producer 106 generates live stream content for distribution via the live streaming service 104. The user may use the content producer 106 to capture video (e.g., of the user's actions) and audio (e.g., of the user speaking, singing, and/or playing an instrument). The content producer 106 provides the live stream content (or content components from which the live stream content may be derived) to the live streaming service 104. The live streaming service 104 may distribute the live stream content, in substantially real time, to one or more content consumers 108. In addition, the live streaming service 104 may provide status data to the on-demand streaming service 102 regarding the current live streaming status of the content producer 106. The on-demand streaming service 102 may use the status data to augment user interfaces displayed by on-demand content applications 186, such as by indicating on a main interface the content producers 106 that are currently live streaming, indicating in search results which of the results are associated with current live stream content, etc. Content consumers 108 executing the on-demand content application 186 may therefore discover live stream content of the content producer 106, and access the live stream content from within the on-demand content application 186. Presentation of the live stream content may then be facilitated through execution of a live content application 188 or component that presents the live stream content within a window of the user interface of the on-demand content application 186. In this way, users of content consumers 108 can discover and access live stream content of the live streaming service 104 from within the user interface of the on-demand content application 186.

Cross-Service Content Producer Linking

Figure 2:
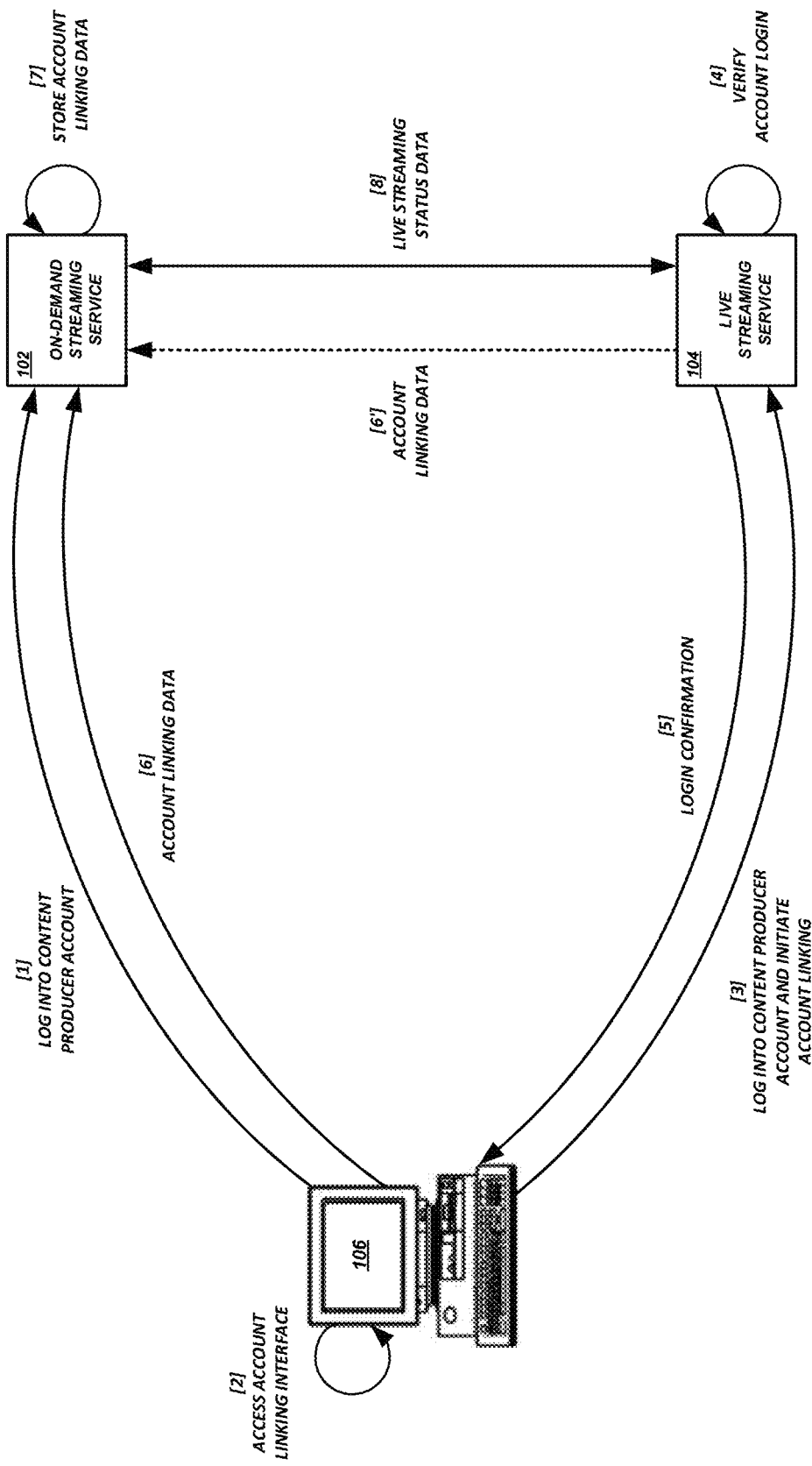
FIG. 2 is block diagram illustrating various data flows and interactions between content producer, an on-demand streaming service, and a live streaming service to link content producer accounts across streaming services according to some embodiments.

FIG. 2 shows example data flows and interactions between a content producer 106, an on-demand streaming service 102, and a live streaming service 104 to link accounts of the content producer 106 across streaming services. Advantageously, as a result of the illustrated data flows and interactions, the on-demand streaming service 102 stores mapping data that maps an on-demand streaming service account of the content producer 106 to a corresponding live streaming service account of the content producer 106. This mapping data can then be used to determine when the content producer 106 is currently live streaming content, notify content consumers 108, and otherwise facilitate discovery and access of the live streaming content by content consumers 108 via an on-demand content application 186 associated with the on-demand streaming service 102.

At [1], a user of the content producer 106 may log into a content producer account with the on-demand streaming service 102. At [2], the user may then access an interface of the on-demand content application 166 to link content producer accounts across services. Illustratively, the interface may display a listing of available live streaming services from which to choose (including live streaming service 104), or the user may navigate to or provide input identifying live streaming service 104. The on-demand content application 166 executed by the content producer 106 may be a separate application—with separate functionality—than the on-demand content application 186 executed by the content consumer 108. For example, the on-demand content application 166 executed by the content producer 106 may only be accessible to users having content producer accounts with the on-demand streaming service 102. The functionality of the on-demand content application 166 may be tailored to content producers, including functionality for linking content producer accounts, managing content producer-specific pages and/or content producer-specific content of the on-demand streaming service 102, etc. In some embodiments, the on-demand content application 166 executed by the content producer 106 may be the same as, or include the same functionality as, the on-demand content application 186 executed by the content consumer 108. For example, the content producer 106 and content consumer 108 may each execute their own instance of the same application, and a user of the content producer 106 may access a particular interface of the application for logging into a content producer account, linking content producer accounts, etc.

At [3], the user may log into the live streaming service 104 and initiate linking of the content producer accounts. For example, the user may activate a user interface option, send a request, or otherwise indicate that the content producer accounts are to be linked. At [4], the live streaming service 104 may verify the account login. If the account login succeeds, the live streaming service 104 may confirm the login and linking of the accounts at [5]. If the account login does not succeed, or if there is no corresponding content producer account with the live streaming service 104, the live streaming service 104 may perform a remedial action such as changing passwords, creating a new account, etc.

The live streaming service 104 may provide account linking data to the content producer 106 that the content producer 106 provides to the on-demand streaming service 102 at [6]. For example, the account linking data may include an identifier of the content producer account with the live streaming service 104, an address at which live streams of the content producer 106 may be accessed at the live streaming service 104, a token that the on-demand streaming service 102 may use to communicate with the live streaming service 104, other data, or some combination thereof. In some embodiments, the live streaming service 104 may provide the linking data directly to the on-demand streaming service 102 at [6'] instead of, or in addition to, providing it to the content producer 106.

At [7], the on-demand streaming service 102 can store the linking data for use in determining and disseminating the availability of live streams of the content producer 106. For example, the on-demand streaming service 102 can store the linking data, or data derived therefrom, in the mapping data store 126.

At [8], the on-demand streaming service 102 may obtain live stream status data from the live streaming service 104. In some embodiments, the on-demand streaming service 102 may request the status data. For example, the on-demand streaming service 102 may periodically poll the live streaming service 104 for status data associated with particular content producer accounts, as indicated by or otherwise associated with linking data in the mapping data store 126. In some embodiments, the live stream service 104 may proactively provide the status data to the on-demand streaming service 102 without a request for the status data. Example processes for communicating live stream status data and using the status data to facilitate discovery and access of live streams via the on-demand content application 186 and on-demand streaming service 102 are described in greater detail below.

In some embodiments, the live streaming service 104 may perform additional actions based on account linking requests. For example, the live streaming service 104 may provide additional features (e.g., "premium" content production features) to content producers who link their accounts with an on-demand streaming service 102.

Live Stream Status Synchronization

Figure 3:
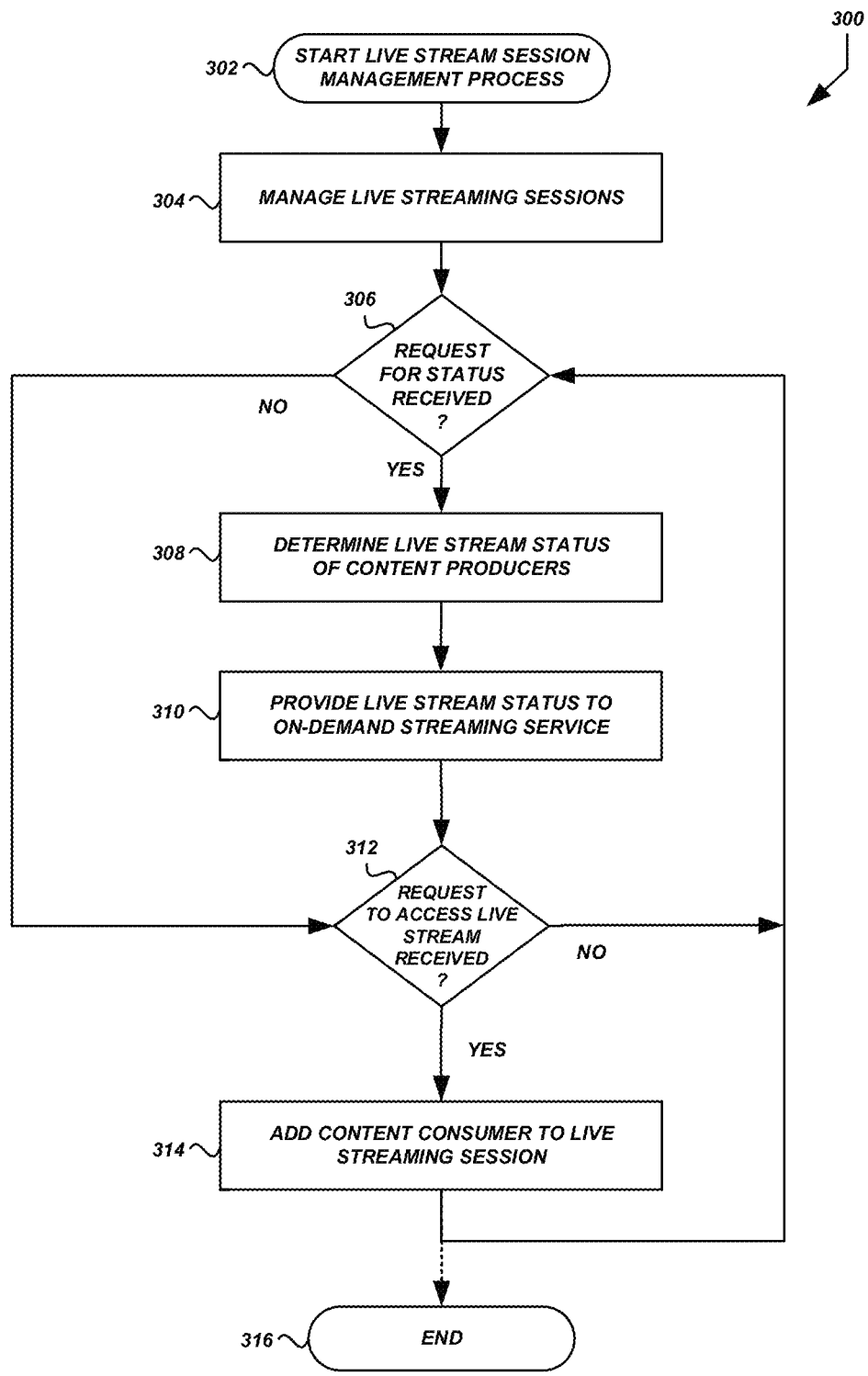
FIG. 3 is a flow diagram of an illustrative process performed by a live streaming service to manage production and distribution of live streams from content producers according to some embodiments.

FIG. 3 is a flow diagram of an illustrative process 300 that may be executed by a live streaming service 104 to manage content production sessions and inform an on-demand streaming service 102 of changes to the live streaming status of content producers 106.

The process 300 begins at block 302. The process 300 may begin in response to an event, such as when the live streaming service 104 begins operation, when the live streaming service 104 establishes a connection with a content producer 106, or in response to some other event. When the process 300 is initiated, a set of executable program instructions stored on one or more non-transitory computer-readable media (e.g., hard drive, flash memory, removable media, etc.) may be loaded into memory (e.g., random access memory or "RAM") of a computing device, such as the live stream service computing device 750 shown in FIG. 7 and described in greater detail below. For example, executable instructions for implementing the functionality of the live stream server 140 and/or live stream status manager 142 may be loaded into memory and executed by a processor. In some embodiments, the process 300 or portions thereof may be implemented on multiple processors, serially or in parallel.

At block 304, the live stream server 140 or some other module or component of the live streaming service 104 may manage live streaming sessions with one or more content producers 106. A content producer 106 may use an application or some other subsystem, such as the live stream production application 168 to connect to the live stream server 140 for the distribution of live stream content generated by the content producer 106. In some embodiments, the live stream production application 168 may use content producer account information to log into the live stream server 140 and initiate a live stream production session. Multiple content producers 106 may connect to a single live stream server 140 for concurrent management of live stream production sessions, or each individual content producer 106 may be assigned to a separate instance of a live stream server 140. Content consumers 108 may access live stream content by using an application or some other subsystem, such as a live content application 188, to connect to a live stream server 140.

At decision block 306, the live stream status manager 142 or some other module or component of the live streaming service 104 may determine whether a request for live streaming status data has been received from an on-demand streaming service 102. For example, the on-demand streaming service 102 may be configured to periodically poll the live stream status manager 142 for live stream status data regarding one or more content producers, such as the content producers for which the on-demand streaming service 102 has account linking data. As another example, the on-demand streaming service 102 may request live stream status when a content consumer 108 begins an on-demand content consumption session with the on-demand streaming service 102. In some embodiments, other events may trigger a request for live stream status data. If a request for live stream status data is received, the process 300 may proceed to block 308. Otherwise, if no request is received, the process 300 may proceed to block 312. In some embodiments, the live stream status manager 142 may provide live stream status data to the on-demand streaming service 102 without necessarily receiving a request for live stream status data. In these embodiments, the process 300 may not include decision block 306, but may instead proceed from block 304 to block 308.

At block 308, the live stream status manager 142 can determine the current live stream status of content producers 106. In some embodiments, a request received from an on-demand streaming service 102 may include content producer identification data specifying the content producers 106 for which the on-demand streaming service 102 desires status data. The content producer identification data may include an identifier of a content producer 106, an address associated with the content producer 106, or other information from which content producers 106 and/or corresponding live streams may be determined. The live stream status manager 142 may use the content producer identification data, or data derived therefrom, to determine the content producer(s) 106 for which the live stream status manager 142 is to produce status data. Determining the live stream status of content producers 106 may involve accessing a listing of current live streaming sessions managed by the live stream server 140, making an application programming interface ("API") call to the live stream server 140 or some other component, or performing some other operation to obtain data indicating which content producers 106, if any, are currently in live streaming sessions.

At block 310, the live stream status manager 142 may provide live stream status data to the on-demand streaming service 102. The live stream status data may indicate which content producers 106 are currently producing live stream content (e.g., which content producers overall, which content producers included in the request, etc.). In some embodiments, the live stream status data may include a listing of the content producers 106 currently producing live stream content. In some embodiments, the live stream status data may include a listing of all content producers for which the on-demand streaming service 102 requested status, along with an indicator of whether each individual content producer 106 is currently live streaming content. In some embodiments, the live stream status data may include address data or other data that may be used by content consumers 108 to access a content producer's live stream. The live stream status data may be transmitted to the on-demand streaming service 102 via a network 100.

At decision block 312, the live streaming service 104 may determine whether a request to access a live streaming session has been received. The request may be received from a live content application 188 executing on a content consumer 108, either by itself or as integrated with an on-demand content application 186. If such a request is received, the process 300 may proceed to block 314. Otherwise, the process 300 may return to a prior block of the process 300, such as decision block 306 or block 304, or the process 300 may terminate at block 316.

At block 314, the live content application 188 (and therefore the content consumer 108 executing the application) may be added to the live streaming session requested above. Adding a content consumer 108 to a live streaming session may include establishing a connection over which live streaming content may be provided to the content consumer 108.

At block 316, process 300 may terminate.

Figure 4:
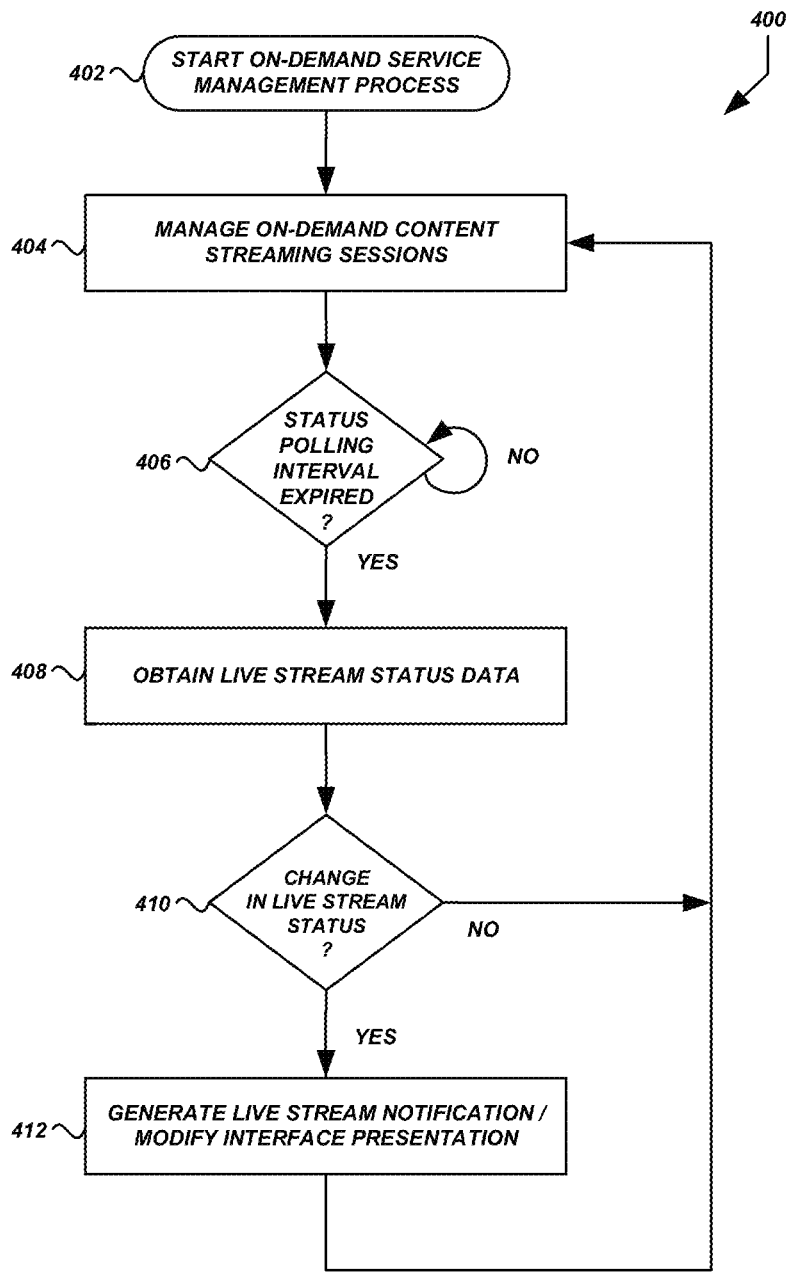
FIG. 4 is a flow diagram of an illustrative process performed by an on-demand streaming service to manage integration of live streams into on-demand streaming sessions according to some embodiments.

FIG. 4 is a flow diagram of an illustrative process 400 that may be executed by an on-demand streaming service 102 to manage streaming content sessions, determine whether live streams of content producers 106 associated with the on-demand streaming service 102 are available, and facilitate discovery and access of the live streams.

The process 400 begins at block 402. The process 400 may begin in response to an event, such as when the on-demand streaming service 102 begins operation, when the on-demand streaming service 102 establishes a connection with a content consumer 108, or in response to some other event. When the process 400 is initiated, a set of executable program instructions stored on one or more non-transitory computer-readable media (e.g., hard drive, flash memory, removable media, etc.) may be loaded into memory (e.g., random access memory or "RAM") of a computing device, such as the on-demand streaming service computing device 700 shown in FIG. 7 and described in greater detail below. For example, executable instructions for implementing the functionality of the content server 120 and/or live stream manager 122 may be loaded into memory and executed by a processor. In some embodiments, the process 400 or portions thereof may be implemented on multiple processors, serially or in parallel.

At block 404, the content server 120 or some other module or component of the on-demand streaming service 102 may manage content streaming sessions with one or more content consumers 108. A content consumer 108 may use an application or some other subsystem, such as the on-demand content application 186 to connect to the content server 120 via network 100 and access content hosted by the on-demand streaming service 102. For example, a user may use the on-demand content application 186 to search for audio content (e.g., music, audiobooks, or podcasts, etc.), video content (e.g., movies, television shows, long-form or short-form videos, etc.), or the like. The search may be made by specifying a content producer (e.g., artist), genre, title, other search term(s), or some combination thereof. The user may access and initiate on-demand presentation of selected content through the on-demand content application 186.

In some embodiments, a user may indicate a particular interest in a content producer 106, such as by "following" the content producer 106. Followed content producers 106 may be handled differently than other content producers 106. For example, followed content producers 106 may be highlighted on a home screen, in search results, or the like. As another example, notifications may be generated to content consumers 108 when there is certain activity associated with a content producer 106 that they are following, such as new on-demand content available, a currently-available live streaming session, or the like.

At decision block 406, the live stream manager 122 or some other module or component of the on-demand streaming service 102 may determine whether a polling interval has expired. The polling interval may be a period of time between requests of the live stream manager 122 for updated live stream status data from the live streaming service 104. The polling interval may be defined as a quantity of time units (e.g., milliseconds, seconds, minutes, etc.) between requests to the live streaming service 104. The polling interval may be static (e.g., always the same quantity of time units) or dynamic (e.g., the quantity of time units will change in response to events or depending upon dynamic parameters, such as time of day, season, etc.). If the polling interval from the last request or receipt of status data has expired, the process 400 may proceed to block 408. Otherwise, the process 400 may remain at decision block 406 until the polling interval has expired, or the process may proceed to some other block of the process 400, such as block 404.

At block 408, the live stream manager 122 may obtain live stream status data from the live streaming service 104. The live stream manager 122 may determine to request live stream status data for a particular content producer 106 or set of content producers 106, such as those that have linked their on-demand content producer accounts with corresponding live streaming content producer accounts. For example, the live stream manager 122 may load content producer account data, identifier data, address data, or the like from the mapping data store 126 and generate a request for lives stream status data. The live stream service 104 may receive, process, and respond to the request by providing live stream status data regarding content producers currently associated with ongoing live streaming sessions, as described in greater detail above. In some embodiments, the live streaming service 104 may provide live stream status data to the live stream manager 122 with requiring, or without first receiving, a request for the live stream status data. For example, the live streaming service 104 may automatically provide live stream status data to the live stream manager 122 when there is a change to a live stream status of any content producer 106, or when there is a change to a live stream status of a content producer 106 with an account liked to the on-demand streaming service 102.

At decision block 410, the live stream manager 122 may determine whether the live stream status of any particular content producer 106 has changed in the time since the last live stream status data was received. In some embodiments, the live stream manager 122 may maintain a listing of content producers 106 who are currently associated with ongoing live streaming sessions, and may analyze any newly-received live stream status data against that listing to determine whether a new content producer 106 is to be added to the listing (e.g., a content producer 106 who has begun a live streaming session in the time since the last live stream status update) and/or whether a content producer 106 on the list should be removed (e.g., a content producer 106 has ended a live streaming session that was active at the time of the last live stream status update).

At block 412, the live stream manager 122 can take one or more actions based on changes to the live stream status of content producers 106, such as generating a notification and/or managing what is presented via a user interface of the on-demand content application 186. In some embodiments, notifications may be made to an entire user base or to a subset thereof based on a notable active streaming session (e.g., a widely popular artist has begun, or will soon begin, a live streaming session). In some embodiments, as described above, individual content consumers 108 (or users thereof) may indicate an interest in a particular content producer 106, such as by "following" the content producer 106. When the live stream manager 122 determines the particular content producer 106 has begun (or will soon begin) a live streaming session, the live stream manager 122 may generate a notification to the content consumers 108 who have indicated an interest in the content producer 106.

In some embodiments, content producers 106 who are associated with active live streaming sessions may be indicated as such in an interface of the on-demand content application 186 and/or other modifications to the interface may be made. For example, the on-demand streaming service 102 may use the status data to augment user interfaces, such as by indicating on a main interface the content producers 106 that are currently live streaming, indicating in search results which of the results are associated with current live stream content, etc. Users of the on-demand content application 186 may therefore discover and access the live stream content from within the on-demand content application 186. Presentation of the live stream content may then be facilitated through execution of a live content application 188 or component that presents the live stream content within a window of the user interface of the on-demand content application 186. Detailed examples of user interfaces showing integration of live streaming application 188 within a window of the user interface of the on-demand content application 186 are described in greater detail below.

User Interface Integration

Figure 5:
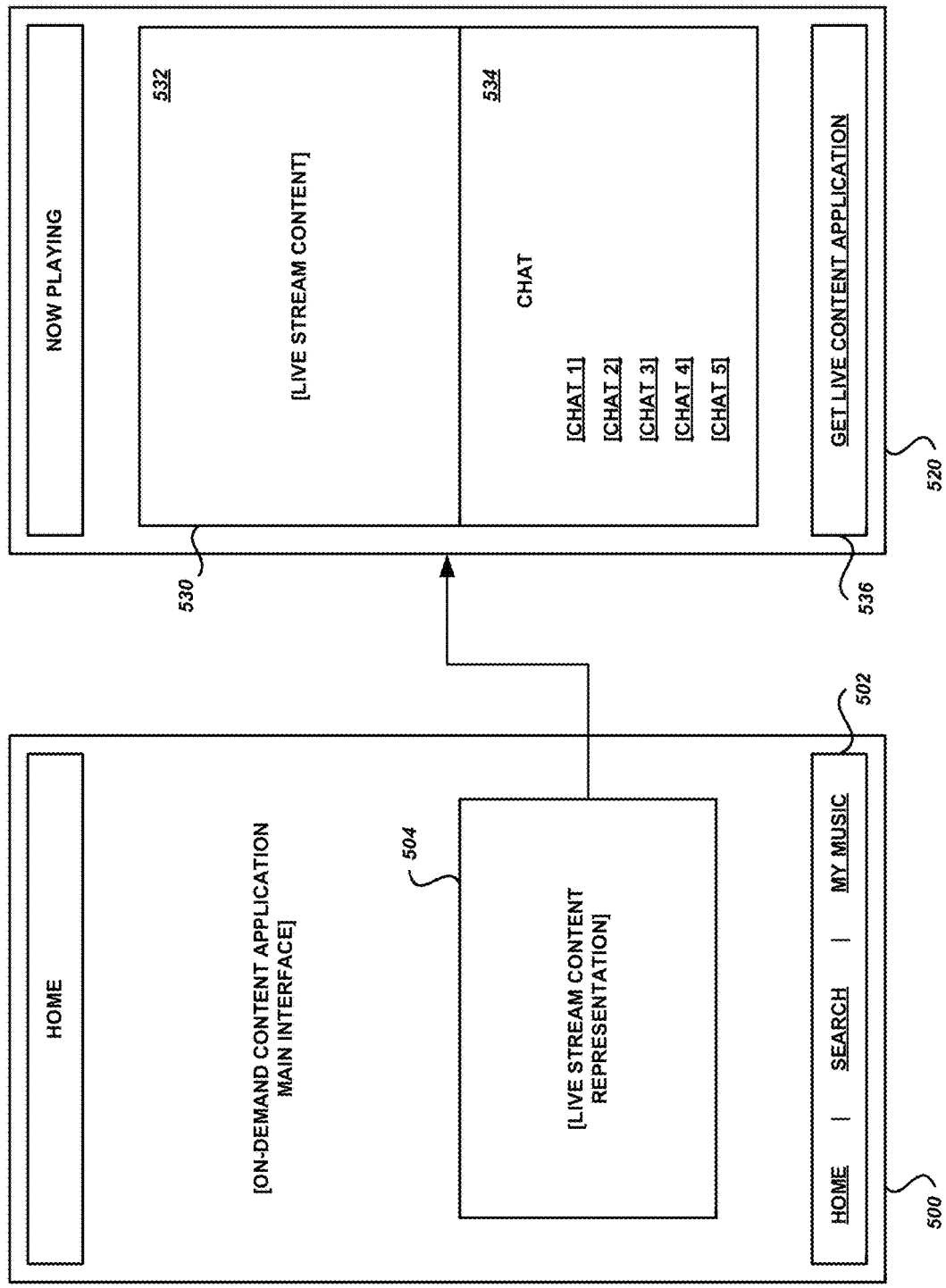
FIG. 5 is a diagram of illustrative on-demand content application user interfaces with integrated live stream content from a live streaming service according to some embodiments.

FIG. 5 is a diagram of illustrative user interfaces of an on-demand content application 186, showing the integration of live streaming content in a portion of the user interface managed by a live content application 188. Main interface 500 may be the first or primary interface displayed when the on-demand content application 186 executes at the beginning of an on-demand streaming session. Main interface 500 may be generated by the on-demand content application 186. For example, the on-demand content application 186 that is stored on—and executed by—a content consumer 108 may include executable code that causes display of the main interface 500. In some embodiments, the on-demand content application 186 may obtain data from the on-demand streaming service 102 for presentation of the main interface 500. For example, the on-demand content application 186 may obtain images, text, formatting data, other data, or some combination thereof. As another example, main interface 500 may be generated based on markup code obtained from the on-demand streaming service 102, such as that in a hypertext markup language ("HTML") file.

The main interface 500 may include interactive controls 502 to access and initiate various features of the on-demand content application 186. For example, as shown, the interactive controls 502 may include controls to access a search feature and display of content associated with the user of the on-demand content application 186, such as an interface with information regarding content producers that the user follows.

The main interface 500 may also include a live stream portion 510 to present data regarding available live streams. In some embodiments, as shown, the live stream portion 510 may be a window within the main interface 500. The content of the window may be generated by the live content application 188. For example, the on-demand content application 186 may receive data from the on-demand streaming service 102 indicating the availability of certain live streams. The on-demand content application 186 may launch or otherwise cause execution of live content application 188 to present content in the live stream portion 510 regarding the available live streams. The on-demand content application 186 may provide data to the live content application 188 indicating which content producer(s) 106 are to be shown or otherwise indicated in the live stream portion 510. For example, the on-demand content application 186 may make an API call to the live content application 188 and provide parameters indicating the content producer(s) 106 to be shown. As another example, live content application 188 may make an API call to the on-demand content application 186 requesting data indicating the content producer(s) to be shown.

To generate content for presentation in the live stream portion 510, the live content application 188 may communicate with the live streaming service 104. The live content application 188 may make an API call to the live streaming service 104 to request content or other data associated with the content producers 106 or their live streams to be shown in the live stream portion 510. Thus, the content of the live stream portion 510 may come from and be managed by the live content application 188 in conjunction with the live streaming service 104, rather than being managed by the on-demand content application 186.

In one specific non-limiting embodiment, the content of the live stream portion 510 may be a carousel of images, clips, or other content that is part of or otherwise represents the currently-available live streams indicated by the on-demand content application 186. A user may select or otherwise activate an item associated with a particular content producer 106 or live stream, and be taken to a live stream interface 520 within the on-demand content application 186. Activation of an item displayed within the live stream portion 510 may be handled by the on-demand content application 186. For example, although the display of the live stream portion 510 may come from and be managed by the live content application 188, any interactions with the interface 500 may be intercepted by the on-demand content application 186 or provided to the on-demand content application 186 by the operating system of the content consumer 108. The on-demand content application 186 may then cause presentation of a different interface, such as live stream interface 520 to provide access to selected live stream content.

In some embodiments, activation of an item displayed within the live stream portion 510 may be handled at least in part by the live content application 188. For example, the live content application 188 may determine that a particular item in the live stream portion 510 has been selected, and the live content application 188 may then switch to a full-featured execution in which the live content application 188 manages the entire interface (e.g., via "deep linking"). As another example, the live content application 188 may make an API call or otherwise provide interaction data to the on-demand content application 186 so that another interface, such as the live stream interface 520, can be presented.

Like the main interface 510, the live stream interface 520 may be generated and managed by the on-demand content application 186, and may include a live stream portion 530. The content of the live stream portion 530 may be managed by the live content application 188. In the live stream interface 520, the live stream portion 530 may present the live stream as provided by the live streaming service 104 substantially as it is provided to a stand-alone live content application 188 (e.g., without integration into an on-demand content application 186). For example, the selected live stream content may be presented within a first window 532, interaction content (e.g., chats) may be presented within a second window 534, and/or other windows may be presented to provide a desired live streaming experience. In some embodiments, a link control 536 may be presented to allow users to switch to a full-featured execution mode of the live content application 188 (e.g., via deep linking), or obtain a version of the live content application 188 that provides more functionality that can be (or is permitted to be) integrated into the live stream interface 520.

Figure 6:
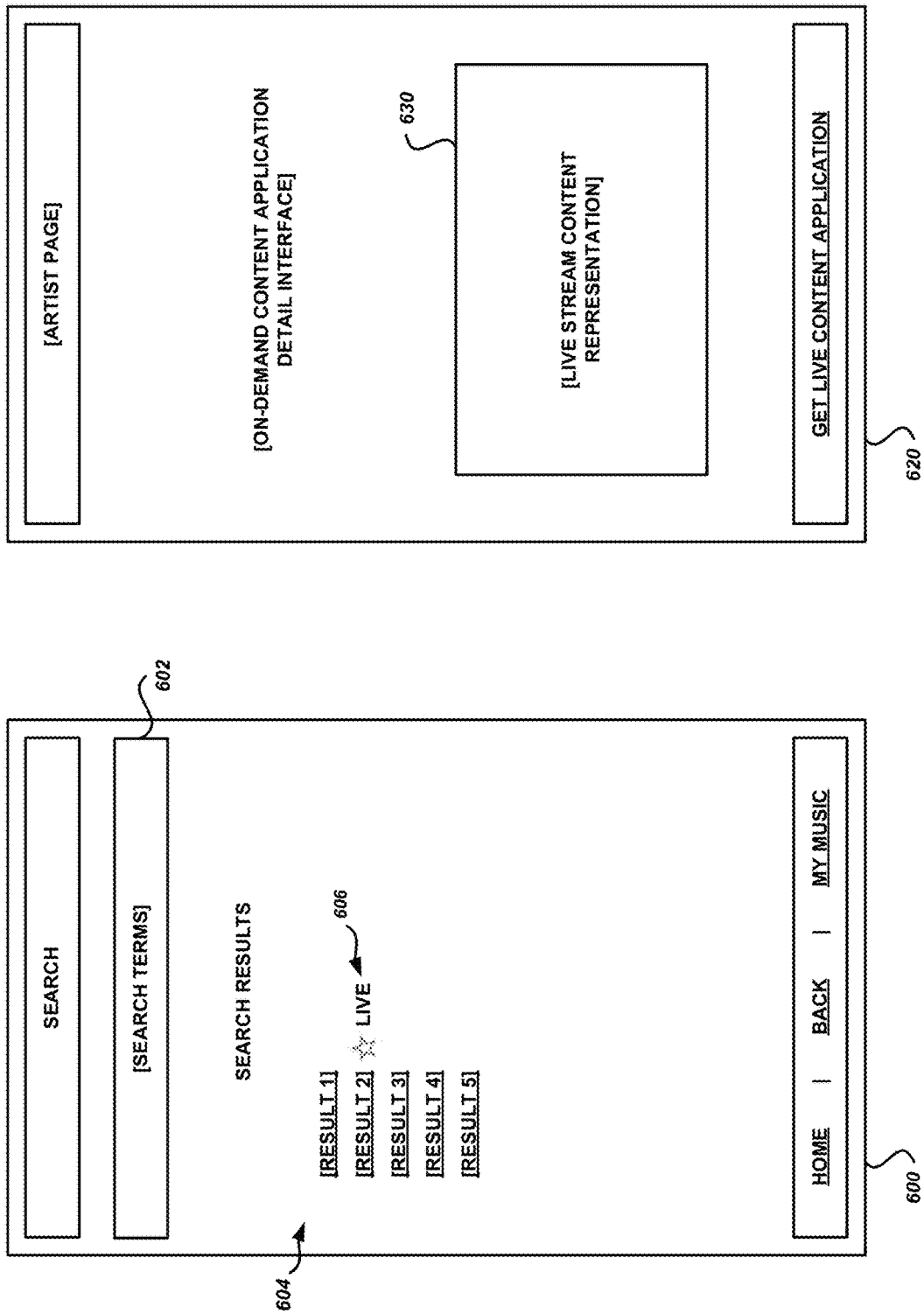
FIG. 6 is a diagram of additional illustrative on-demand content application user interfaces with integrated live stream content from a live streaming service according to some embodiments.

FIG. 6 is a diagram of additional user interfaces of the on-demand content application 186. The additional user interfaces may be presented when accessing particular features of the on-demand content application 186, such as the search feature shown in FIG. 5.

Search interface 600 may be generated by the on-demand content application 186. The search interface 600 may include a search control 602 to allow users to search for on-demand content. The on-demand content application 186 may use search terms entered into search control 602 to obtain search results 604 from the on-demand streaming service 102. The on-demand streaming service 102 may indicate which of the search results, if any, are associated with currently-available (or upcoming scheduled) live stream content. The on-demand content application 186 may display the results 604 accordingly, augmenting the display of search result items associated with live stream content. The augmentation may include an icon, text, color, texture, animation, other visual augmentation, or some combination thereof. As shown in FIG. 6, a search result item 606 includes an augmentation icon indicating the availability of live stream content.

If a user selects or otherwise activates a search result associated with live stream content, the on-demand content application 186 may present an interface with additional information regarding the selected search result and means to access the live stream content. For example, the on-demand content application 186 may present detail interface 620. In addition to providing additional information regarding the selected search result (e.g., background information, images, controls to access on-demand content, etc.), the detail interface 620 may include a live stream portion 630. In some embodiments, as shown, the live stream portion 630 may be a window within the detail interface 620. The content of the window may be generated by the live content application 188. For example, the on-demand content application 186 may launch or otherwise cause execution of live content application 188 to present content in the live stream portion 630 regarding the available live stream associated with the selected search result. The on-demand content application 186 may provide data to the live content application 188 indicating which content producer 106 is to be shown or otherwise indicated in the live stream portion 630. For example, the on-demand content application 186 may make an API call to the live content application 188 and provide parameters indicating the content producer 106 to be shown. As another example, live content application 188 may make an API call to the on-demand content application 186 requesting data indicating the content producer to be shown.

To generate content for presentation in the live stream portion 630, the live content application 188 may communicate with the live streaming service 104. The live content application 188 may make an API call to the live streaming service 104 to request content or other data associated with the content producer 106 or the associated live stream to be shown in the live stream portion 630. In one specific non-limiting embodiment, the content of the live stream portion 630 may be a still image or video clip of the live stream, a low-resolution version of the live stream, or other content that is part of or otherwise represents the currently-available live stream indicated by the on-demand content application 186. A user may select or otherwise activate the live stream portion 630, and be taken to a live stream interface within the on-demand content application 186, such as live steam interface 520. Activation of the live stream portion 630 may be handled by the on-demand content application 186 and/or the live content application 188, as described above.

In some embodiments, the live streaming service 104 may compile data regarding access of live streams through a stand-alone live content application 188, and through live content application-managed interfaces integrated into on-demand content applications 186. For example, each time a live stream is presented, the application that is managing presentation of the live stream may send data to the live streaming service 104 indicating the stand-alone or integrated nature of the presentation interface. The live streaming service 104 may then track the quantity of live streams presented using the different methods. The live streaming service 104 may augment live streams, or content associated with live streams, to indicate the quantity of live streams.

Execution Environment

FIG. 7 illustrates the various components of an example on-demand streaming service computing device 700 configured to implement various functionality of on-demand streaming service 102. In some embodiments, as shown, the computing device 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SDDs"), flash drives, and/or other persistent non-transitory computer-readable media; and one or more computer readable memories 710, such as random access memory ("RAM") and/or other volatile non-transitory computer-readable media.

The computer readable memory 710 may include computer program instructions that one or more computer processors 702 execute in order to implement one or more embodiments. The computer readable memory 710 can store an operating system 712 that provides computer program instructions for use by the computer processor(s) 702 in the general administration and operation of the computing device 700. In some embodiments, the computer readable memory 710 can further include computer program instructions and other information for implementing aspects of the present disclosure. For example, in one embodiment, the computer-readable memory 710 may include content server instructions 714 for implementing features of the content server 120, live stream manager instructions 716 for implementing features of the live stream manager 122, etc.

FIG. 7 also illustrates the various components of an example live streaming service computing device 750 configured to implement various functionality of live streaming service 104. In some embodiments, as shown, the computing device 750 may include: one or more computer processors 752; one or more network interfaces 754; one or more computer readable medium drives 756; and one or more computer readable memories 760.

The computer readable memory 760 may include computer program instructions that one or more computer processors 752 execute in order to implement one or more embodiments. The computer readable memory 760 can store an operating system 762 that provides computer program instructions for use by the computer processor(s) 752 in the general administration and operation of the computing device 750. In some embodiments, the computer readable memory 760 can further include computer program instructions and other information for implementing aspects of the present disclosure. For example, in one embodiment, the computer-readable memory 760 may include live stream server instructions 764 for implementing features of the live stream server 140, live stream status manager instructions 766 for implementing features of the live stream status manager 142, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of a live streaming service comprising one or more computing devices configured to execute specific instructions,
   establishing a live stream content production session with a content producer, wherein the live stream content production session comprises generation of live stream video content by the content producer for distribution to consumer devices, and wherein the content producer is associated with a first content producer account for the live streaming service and a second content producer account for an on-demand streaming service;
   establishing a first streaming session with a first consumer device, wherein the first streaming session comprises presentation of the live stream video content and interaction content associated with the live stream video content in an instance of a live content application executed by the first consumer device;
   generating status data representing a status of the content producer as presently generating the live stream video content, wherein the status data is generated based on both (i) establishing the live stream content production session with the content producer, and (ii) a predetermined association of the first content producer account with the second content producer account;
   providing the status data to the on-demand streaming service; and
   subsequent to providing the status data to the on-demand streaming service, establishing a second streaming session with a second consumer device, wherein the second streaming session comprises presentation of the live stream video content and the interaction content within an instance of an on-demand content application executing on the second consumer device and associated with the on-demand streaming service, and wherein an interaction with the interaction content by the first consumer device is presented within the instance of the on-demand content application executing on the second consumer device.

2. The computer-implemented method of claim 1, further comprising:
   receiving from the on-demand streaming service, a request for the status data, wherein the request comprises account data representing the content producer; and
   determining, based on the live stream content production session being active, to generate the status data.

3. The computer-implemented method of claim 1, further comprising:
   determining, based on the live stream content production session being active, to notify the on-demand streaming service of the status of the content producer, wherein the status data is provided to the on-demand streaming service without receiving a request for the status data.

4. The computer-implemented method of claim 1, further comprising:
   generating first stream count data based at least partly on establishing the first streaming session, wherein the first stream count data represents a quantity of streaming sessions associated with the live content application; and
   generating second stream count data based at least partly on establishing the second streaming session, wherein the second stream count data represents a quantity of streaming sessions associated with the on-demand content application.

5. The computer-implemented method of claim 1, further comprising:
   receiving a request to link a content producer account of the content producer with an on-demand streaming account of the content producer, wherein the on-demand streaming account is associated with the on-demand streaming service; and
   providing, in response to the request, producer account data representing the content producer account.

6. The computer-implemented method of claim 5, further comprising determining, based at least partly on the request to link the content producer account with the on-demand streaming account, to make one or more features available to the content producer.

7. The computer-implemented method of claim 1, wherein establishing the second streaming session comprises sending the live stream video content to a web page in a frame of the instance of the on-demand content application.

8. The computer-implemented method of claim 1, wherein establishing the second streaming session comprises sending the live stream video content to a second live content application executed by the second consumer device.

9. A content management system comprising:
   a live streaming service comprising one or more computing devices; and
   an on-demand streaming service comprising one or more computing devices;
   wherein the on-demand streaming service is configured to at least:
      maintain a mapping of on-demand streaming service account data associated with a content producer to live streaming service account data associated with the content producer, wherein the content producer is associated with a first content producer account for the live streaming service and a second content producer account for the on-demand streaming service;
      periodically poll the live streaming service for status data representing a live streaming status of the content producer;
      determine, based on the status data, to send a notification to a first content consumer regarding the live streaming status of the content producer; and establish a first streaming session with an on-demand content application executing on the first content consumer, wherein the first streaming session comprises presentation, by the on-demand content application, of streaming content from the on-demand streaming service; and wherein the live streaming service is configured to at least:
  establish a live stream content production session with the content producer, wherein the live stream content production session comprises generation of live stream video content by the content producer for distribution to content consumers;
  generate the status data representing the live streaming status of the content producer as presently generating the live stream video content, wherein the status data is generated based on both (i) establishing the live stream content production session with the content producer, and (ii) a predetermined mapping of the live streaming service account data to the on-demand streaming service account data;
  provide the status data to the on-demand streaming service in response to polling by the on-demand streaming service; and
  establish a second streaming session with a live content application executing on the first content consumer, wherein the second streaming session comprises presentation of:
    the live stream video content in a first window of the live content application within an interface of the on-demand content application; and
    interaction content within a second window of the live content application, wherein an interaction with the interaction content by a second content consumer is displayed in the second window of the live content application executing on the first content consumer.

10. The content management system of claim 9, wherein:
the live streaming service is further configured to provide streams of live content, generated by content producers, to content consumers in substantially real time; and
the on-demand streaming service is further configured to provide streams of prerecorded content, generated by the content producers and stored in a content data store, to the content consumers on demand.

11. The content management system of claim 9, wherein the on-demand streaming service is further configured to:
generate live stream availability data based at least partly on the status data, wherein the live stream availability data represents a plurality of content producers associated with available live stream video content, and wherein the content producer is included in the plurality of content producers based at least partly on the status data; and
send the live stream availability data to the first content consumer during the first streaming session, wherein the on-demand content application is configured to present a live stream access control using the live stream availability data.

12. A system comprising:
a content data store comprising computer-readable storage storing a plurality of content items; and
an on-demand streaming service comprising one or more computing devices, wherein the on-demand streaming service is configured to at least:
  receive, from a live streaming service, status data representing a live streaming status of a content producer as presently generating live stream video content, wherein the status data is based on both (i) establishment, by the live streaming service, of a live stream content production session with the content producer, and (ii) a predetermined mapping of on-demand streaming service account data associated with the content producer to live streaming service account data associated with the content producer, wherein the content producer is associated with a first content producer account for the live streaming service and a second content producer account for the on-demand streaming service;
  generate, based on the status data, availability data representing availability of the live stream video content of the content producer;
  send the availability data to an on-demand content application executing on a first consumer device, wherein the on-demand content application is configured to establish a first streaming session with the live streaming service based at least partly on the availability data, wherein the first streaming session comprises presentation of the live stream video content in a first user interface window of the on-demand content application and presentation of interaction content associated with the live stream video content in a second user interface window of the on-demand content application, and wherein an interaction with the interaction content by a second consumer device is presented within the second user interface window of the on-demand content application executing on the first consumer device; and
  establish a second streaming session with the on-demand content application executing on the first consumer device, wherein the second streaming session comprises presentation, by the on-demand content application, of a content item of the plurality of content items.

13. The system of claim 12, wherein the on-demand streaming service is further configured to generate link data representing a link of the on-demand streaming service account data associated with the content producer to the live streaming service account data associated with the content producer.

14. The system of claim 13, wherein the on-demand streaming service is further configured to periodically request the status data from the live streaming service based at least partly on the link data.

15. The system of claim 12, wherein status data is received from the live streaming service without a request from the on-demand streaming service.

16. The system of claim 12, wherein the on-demand streaming service is further configured to:
receive a search request from the on-demand content application;
generate search results in response to the search request, wherein the search results comprise a plurality of search result items, and wherein a first search result item of the plurality of search result items is associated with the content producer; and
send the search results to the on-demand content application, wherein the on-demand content application is configured to present a search result interface with a display object indicating availability of live stream video content of the content producer.

17. The system of claim 12, wherein the on-demand streaming service is further configured to:

determine, based on the status data, to send a notification to a plurality of consumer devices associated with account data indicating an interest in the content producer; and send the notification to the plurality of consumer devices.

18. The system of claim 12, wherein the on-demand streaming service is further configured to determine, based on the status data, to include in a primary interface of the on-demand content application a display object indicating availability of live stream video content of the content producer.

19. The system of claim 12, wherein the on-demand streaming service is further configured to determine, based on the status data, to include in a content-producer-specific interface of the on-demand content application a display object indicating availability of live stream video content of the content producer.

20. The system of claim 12, wherein the interaction content is associated with a multi-device chat session, and wherein the interaction with the interaction content by the second consumer device comprises entry of a chat message during presentation of the live stream video content by the second consumer device.

\* \* \* \* \*